(12) United States Patent
Satou et al.

(10) Patent No.: US 12,123,651 B2
(45) Date of Patent: Oct. 22, 2024

(54) FURNACE MONITORING DEVICE

(71) Applicant: IHI Corporation, Koto-ku (JP)

(72) Inventors: Naoki Satou, Tokyo (JP); Tatsurou Tanoue, Tokyo (JP)

(73) Assignee: IHI Corporation, Koto-ku (JP)

( * ) Notice: Subject to any disclaimer, the term of this patent is extended or adjusted under 35 U.S.C. 154(b) by 77 days.

(21) Appl. No.: 17/997,310

(22) PCT Filed: May 17, 2021

(86) PCT No.: PCT/JP2021/018592
§ 371 (c)(1),
(2) Date: Oct. 27, 2022

(87) PCT Pub. No.: WO2021/235388
PCT Pub. Date: Nov. 25, 2021

(65) Prior Publication Data
US 2023/0168037 A1 Jun. 1, 2023

(30) Foreign Application Priority Data
May 18, 2020 (JP) .................. 2020-086657

(51) Int. Cl.
F27D 21/02 (2006.01)
G01J 5/00 (2022.01)
G01J 5/08 (2022.01)
G06T 7/00 (2017.01)
(Continued)

(52) U.S. Cl.
CPC ............ *F27D 21/02* (2013.01); *G01J 5/0044* (2013.01); *G01J 5/0859* (2013.01); *G06T 7/0002* (2013.01); *H04N 7/183* (2013.01); *H04N 23/23* (2023.01); *F27D 2021/026* (2013.01); *G06T 2207/10048* (2013.01); *G06T 2207/30232* (2013.01)

(58) Field of Classification Search
None
See application file for complete search history.

(56) References Cited

U.S. PATENT DOCUMENTS

2007/0006656 A1* 1/2007 Batzinger ............ G01N 29/262
73/606
2012/0270162 A1* 10/2012 Dahlhielm .............. F23N 5/082
431/12
(Continued)

FOREIGN PATENT DOCUMENTS

JP 60-86749 U 6/1985
JP 62-9113 A 1/1987
(Continued)

OTHER PUBLICATIONS

International Search Report mailed on Jun. 22, 2021 in PCT/JP2021/018592 filed on May 17, 2021 (4 pages).

*Primary Examiner* — Stefan Gadomski
(74) *Attorney, Agent, or Firm* — Oblon, McClelland, Maier & Neustadt, L.L.P.

(57) ABSTRACT

A furnace monitoring device includes an imaging unit to capture an image of combustion ash adhering to a monitoring position in a furnace, an evaluation unit to evaluate a deposition state of combustion ash on the basis of a monitoring image which is output from the imaging unit, and an alert unit to output an alert for the combustion ash on the basis of a result of evaluation from the evaluation unit.

5 Claims, 3 Drawing Sheets

(51) Int. Cl.
*H04N 7/18* (2006.01)
*H04N 23/23* (2023.01)

(56) References Cited

U.S. PATENT DOCUMENTS

| | | | | |
|---|---|---|---|---|
| 2012/0292523 | A1* | 11/2012 | George | G01B 15/00 |
| | | | | 250/336.1 |
| 2013/0176418 | A1* | 7/2013 | Pandey | H04N 5/33 |
| | | | | 348/E5.09 |
| 2017/0298522 | A1* | 10/2017 | Hong | C10G 75/02 |
| 2017/0299524 | A1* | 10/2017 | Arora | C25D 17/06 |
| 2020/0191487 | A1* | 6/2020 | Harada | F23N 5/082 |

FOREIGN PATENT DOCUMENTS

| | | | |
|---|---|---|---|
| JP | 4-90415 | A | 3/1992 |
| JP | 4-294265 | A | 10/1992 |
| JP | 3985867 | B2 * | 10/2007 |
| JP | 2009058216 | A * | 3/2009 |
| JP | 2019-134316 | A | 8/2019 |
| PL | 185142 | B1 * | 7/1997 |

* cited by examiner

FURNACE MONITORING DEVICE

TECHNICAL FIELD

The present disclosure relates to a furnace monitoring device. Priority is claimed on Japanese Patent Application No. 2020-086657, filed May 18, 2020, the content of which is incorporated herein by reference.

BACKGROUND ART

Patent Document 1 discloses a furnace monitoring device that captures an image of a furnace of a boiler with a monitoring television camera and monitors a furnace state on the basis of the image. The furnace monitoring device is configured to supply light from a light source to a light-transmitting lens via light-transmitting optical fiber and to ascertain a furnace state even when the furnace is dark by furnace-imaging optical fiber being provided between the light transmitting lens and the monitoring television camera.

CITATION LIST

Patent Document

Patent Document 1

Japanese Unexamined Utility Model Application, First Publication No. S60-86749

SUMMARY OF INVENTION

Technical Problem

The technique disclosed in the related art is for monitoring a furnace of a boiler using the monitoring television camera and is not for monitoring a combustion ash state but for monitoring a furnace bottom. As known well, ash generated by burning fuel (i.e., combustion ash) adheres to heat transfer pipes at various positions. In the technical field of boilers, selection of fuel which is less likely to adhere, intentional removal of combustion ash, or/and injection of an additive are performed for such combustion ash.

However, such combustion ash countermeasures in the related art are restrictive. Particularly, with recent increase in the number of types of fuel, it is very difficult to take effective measure against combustion ash for each type of fuel.

The present disclosure was made in consideration of the aforementioned circumstances and an objective thereof is to provide a furnace monitoring device that can evaluate a deposition state of combustion ash more effectively than in the related art.

Solution to Problem

In order to achieve the aforementioned objective, according to a first aspect of the present disclosure, there is provided a furnace monitoring device including: an imaging unit configured to capture an image of combustion ash adhering to a monitoring position in a furnace; an evaluation unit configured to evaluate a deposition state of combustion ash on the basis of a monitoring image which is output from the imaging unit; and an alert unit configured to output an alert for the combustion ash on the basis of a result of evaluation from the evaluation unit.

A second aspect of the present disclosure provides the furnace monitoring device according to the first aspect, in which the furnace is a combustion furnace of a boiler.

A third aspect of the present disclosure provides the furnace monitoring device according to the second aspect, in which the monitoring position is a superheater.

A fourth aspect of the present disclosure provides the furnace monitoring device according to the first to third aspects, in which the monitoring position is a position near a burner that is provided in the furnace.

A fifth aspect of the present disclosure provides the furnace monitoring device according to any one of the first to fourth aspects, in which the imaging unit is an infrared camera that captures an image of the combustion ash except for flames.

Effects of Invention

According to the present disclosure, it is possible to provide a furnace monitoring device that can evaluate a deposition state of combustion ash more effectively than in the related art.

DESCRIPTION OF EMBODIMENTS

Hereinafter, an embodiment of the present disclosure will be described with reference to the accompanying drawings.

A furnace monitoring device A according to this embodiment monitors a combustion furnace of a boiler as a monitoring object. That is, a furnace X in this embodiment is a combustion furnace of a boiler.

Figure 1:
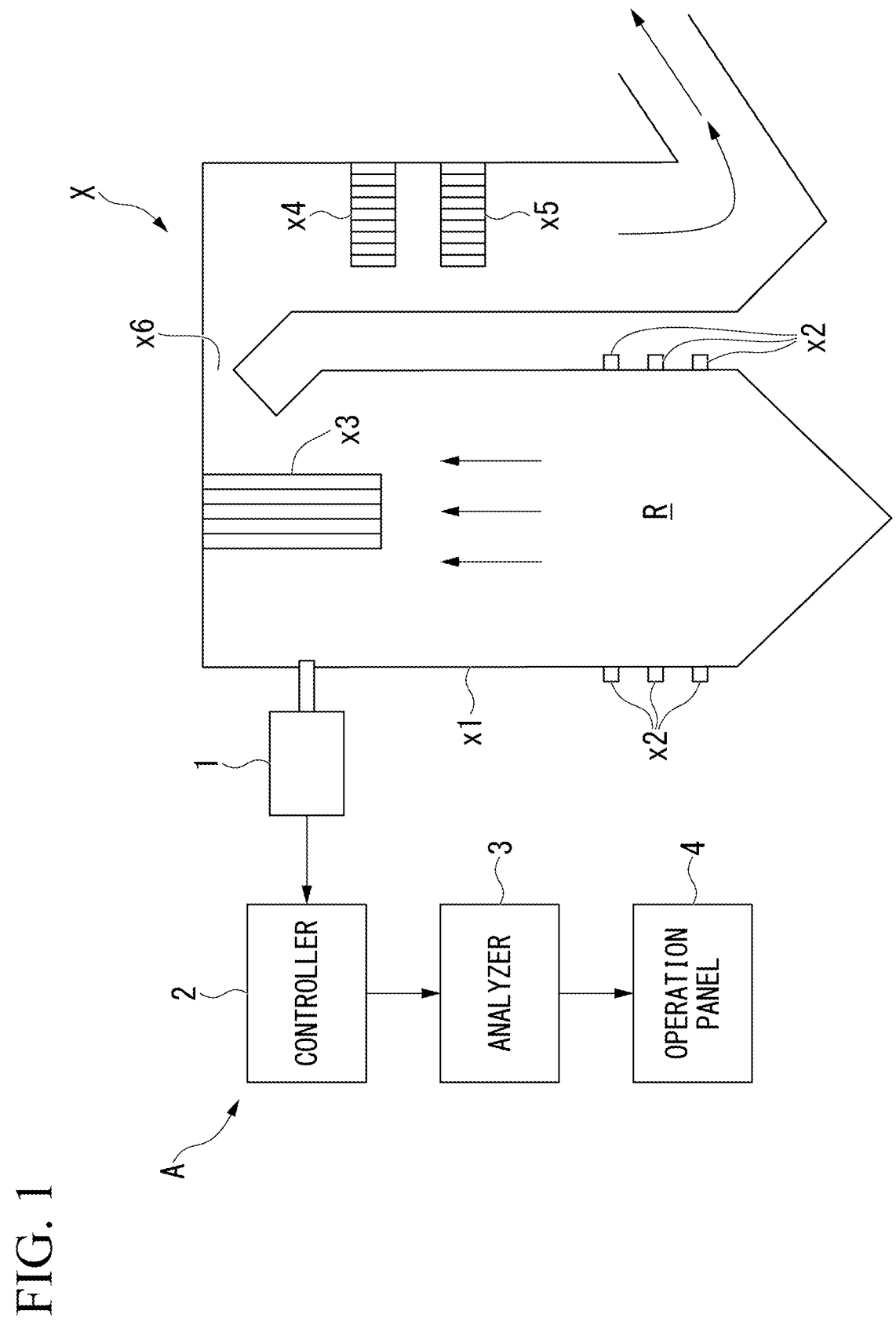
FIG. 1 is a block diagram showing a functional configuration of a furnace monitoring device according to an embodiment of the present disclosure.

As shown in FIG. 1, a boiler is a facility that has a bent shape in a front view and generates steam using heat acquired by combusting predetermined fuel (i.e., combustion heat). The boiler is, for example, a facility that is provided in a power plant and generates steam as a working fluid for driving a steam turbine. The boiler includes, for example, a boiler wall x1, a plurality of burners x2, a superheater x3, a reheater x4, a preheater x5, and a bent portion x6.

The boiler wall x1 is a plate-shaped member that forms an external shape of the boiler, and a plurality of heat transfer tubes are connected parallel to each other to form a plate shape. In the plurality of heat transfer tubes forming the boiler wall x1, water flows from one end to the other end. This water is heated by the combustion heat and some thereof becomes steam.

In a partial area of the boiler wall x1, the plurality of burners x2 are provided to constitute a combustion chamber R as shown in the drawing. That is, in the boiler shown in FIG. 1, the left part of the bent portion x6 constitutes the combustion chamber R in which fuel is combusted, and the plurality of burners x2 are provided in the vicinity of the lower end. The combustion chamber R has a rectangular shape in a horizontal section.

Figure 2:
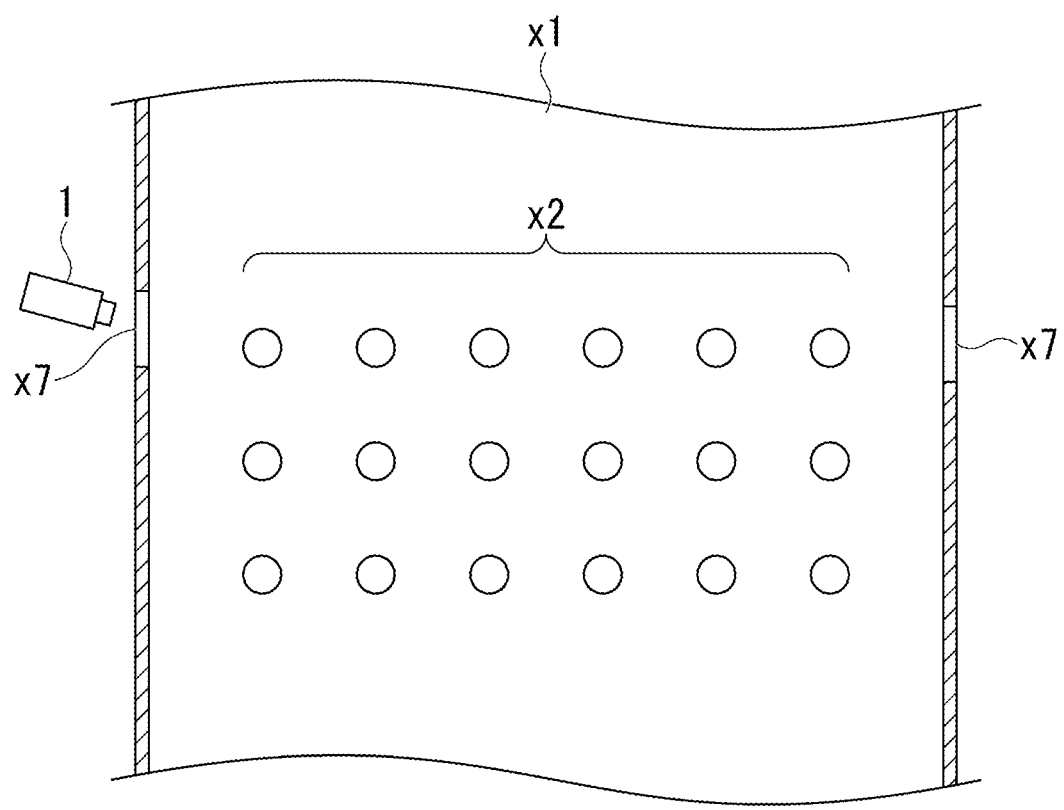
FIG. 2 is a diagram schematically showing a monitored state near a burner according to the embodiment of the present disclosure.

The plurality of burners x2 are provided in the boiler walls x1 that forms the combustion chamber R and are disposed in parallel. That is, the plurality of burners x2 are provided to face each other. In one of a pair of boiler walls x1 facing each other in parallel, the burners x2 are provided in a plurality of stages (three stages) in a vertical direction and in a plurality of stages (six stages) in a lateral direction as shown in FIG. 2. In the other of the pair of boiler walls x1, a plurality of burners x2 arranged in the same way as in the one of the pair of boiler walls x1 are provided.

The arrangement of the burners x2 shown in FIG. 2 is merely an example. The boiler may have various arrangements of the burners x2 depending on its size, application, or the like. For example, a plurality of burners x2 may be provided in a predetermined shape in only one of the pair of boiler walls x1 facing each other in parallel.

The plurality of burners x2 inject fuel such as powdered coal or biomass supplied from a fuel supply system (that is not shown) into the combustion chamber R and combust the fuel using combustion air separately supplied into the combustion chamber R by an air supply system as an oxidant. That is, in the combustion chamber R, fuel injected from the burners x2 is combusted to generate combustion gas of a high temperature.

In the combustion chamber R, combustion ash is generated with combustion of fuel. Most of the combustion ash falls down in the combustion chamber R and is collected, but some of the combustion ash rises along with combustion gas and flows from the combustion chamber R to an exhaust port E in the boiler. The combustion gas of a high temperature functions as a heat source for generating steam in the boiler and also functions as a powder carrier for carrying combustion ash to the exhaust port E.

The superheater x3 is a heat exchanger that further heats saturated steam generated in the boiler and is provided just above the combustion chamber R in an internal space of the boiler surrounded by the boiler wall x1. The superheater x3 generates superheated steam with higher thermal energy than the saturated steam by allowing the saturated steam to exchange heat with the combustion gas.

The reheater x4 is a heat exchanger that reheats steam supplied to driving of a steam turbine and is provided just behind the bent portion x6 in the internal space of the boiler. The steam turbine in a power plant may have various structures, and some power plants may include a low-pressure steam turbine in addition to a high-pressure steam turbine. For example, the reheater x4 may reheat steam supplied for driving of the high-pressure turbine before supplying the steam to the low-pressure steam turbine.

The coal economizer x5 is a heat exchanger (i.e., a preheater) which is also called an economizer and is provided downstream from the reheater x4 in a flow direction of combustion gas in the internal space of the boiler. The coal economizer x5 heats (i.e., preheats) boiler-supplied water before it is vaporized in order to achieve improvement in thermal efficiency of the boiler.

Here, the heat exchangers in the boiler may have various structures. The heat exchangers shown in FIG. 1, that is, the superheater x3, the reheater x4, and the coal economizer x5 are merely an example. For example, the boiler in this embodiment may include an air preheater that preheats combustion air supplied from the outside air and supplies the preheated air to the combustion chamber R in addition to the coal economizer x5 that preheats boiler-supplied water.

The bent portion x6 is a portion having a smallest flow channel area of combustion gas generated in the combustion chamber R in the internal space of the boiler and is a portion in which a flow direction of combustion gas changes from a rising flow to a falling flow. The bent portion x6 is also a portion to which combustion ash included in combustion gas is likely to adhere.

Regarding the combustion furnace X of the boiler, the furnace monitoring device A according to this embodiment includes an infrared camera 1, a controller 2, an analyzer 3, and a monitoring panel 4 as shown in FIG. 1.

The infrared camera 1 is an imaging device provided with a predetermined monitoring position in the combustion furnace X (i.e., a furnace) as an imaging position and images combustion ash adhering to the monitoring position. That is, the infrared camera 1 generates a two-dimensional thermal image of the monitoring position as a monitoring image by detecting infrared light radiated from the monitoring position and outputs the generated monitoring image to the controller 2.

For example, the infrared camera 1 images combustion ash except for flames radiated from the burners x2 into the combustion furnace X. That is, the infrared camera 1 detects only infrared light in a specific wavelength band not including infrared light in a wavelength band radiated from flames in an infrared range of electromagnetic waves. The monitoring image (i.e., thermal image) of the infrared camera 1 is a two-dimensional image satisfactorily representing a monitoring position state in which flames do not serve as a disturbance.

The monitoring image (i.e., thermal image) is, for example, a monochrome image in which a luminance value increases as an amount of adhering combustion ash increases. That is, the monitoring image (i.e., thermal image) is a two-dimensional image in which an amount of adhering combustion ash is correlated with a luminance value, for example, the luminance value becomes closer to white as the amount of combustion ash increases and the luminance value becomes closer to black as the amount of adhering combustion ash decreases. For example, a furnace monitoring camera made by Lumasense Technologies, Inc. can be employed as the infrared camera 1.

The monitoring position in this embodiment is, for example, one or two or more of the boiler wall x1 near the burners x2, that is, surroundings of the burners x2 (i.e., a wall around the burners x2 in the boiler wall x1), the superheater x3, the bent portion x6, the reheater x4, and the coal economizer x5. Particularly, the boiler wall x1 near the burners x2 which is a part of the combustion chamber R and the superheater x3 are a position of the internal space of the boiler, that is, a flow channel of combustion gas and combustion ash, to which combustion ash is likely to adhere.

In a pair of boiler walls x1 (i.e., sidewalls) crossing the pair of boiler walls x1 in which the burners x2 are provided, a monitoring window x7 for monitoring a state of the burners x2 is often provided in each sidewall as shown in FIG. 2. When the boiler wall x1 near the burners x2 is set as the monitoring position, for example, the infrared camera 1 captures an image of the boiler wall x1 near the burners x2 through the monitoring window x7.

That is, when the boiler wall x1 near the burners x2 is set as the monitoring position, it is possible to fix the infrared camera 1 without performing machining for forming an opening in the boiler wall x1. Accordingly, according to this embodiment, it is possible to easily fix the infrared camera 1 to an existing boiler.

The infrared camera 1 is provided to include the monitoring position in a viewing angle thereof. One infrared camera 1 is shown in FIG. 1, but the number of infrared cameras 1 is not limited to one. That is, the infrared camera 1 may be provided for each monitoring position, or a plurality of monitoring positions may be simultaneously imaged with one infrared camera 1.

The controller 2 controls the infrared camera 1 and receives a monitoring image (i.e., thermal image) input from the infrared camera 1. That is, the controller 2 controls a timing at which a monitoring image (i.e., thermal image) is captured by the infrared camera 1. The controller 2 receives a monitoring image (i.e., thermal image) captured at the imaging timing designated by itself from the infrared camera 1 and supplies the received monitoring image (i.e., thermal image) to the analyzer 3. The controller 2 is a computer that operates on the basis of a control program stored in advance. That is, the controller 2 is a type of computer including a central processing unit (i.e., CPU), a main storage device such as a random access memory (i.e., RAM) or a read only memory (i.e., ROM), and an auxiliary storage device such as a solid state drive (i.e., SSD) or a hard disk drive (i.e., HDD).

The analyzer 3 evaluates a deposition state of combustion ash at the monitoring position on the basis of the monitoring image (i.e., thermal image). That is, the analyzer 3 acquires a monitoring image (i.e., thermal image) output from the infrared camera 1 via the controller 2 and evaluates an amount of deposited combustion ash t by performing predetermined image processing on the monitoring image (i.e., thermal image). The analyzer 3 constitutes an evaluator along with the controller 2.

The analyzer 3 is a computer that performs image processing on a monitoring image (i.e., thermal image) on the basis of an analysis program stored in advance and evaluates an amount of deposited combustion ash t on the basis of the result of image processing. That is, the analyzer 3 is a type of computer including a central processing unit (i.e., CPU), a main storage device such as a random access memory (i.e., RAM) or a read only memory (i.e., ROM), and an auxiliary storage device such as a solid state drive (i.e., SSD) or a hard disk drive (i.e., HDD). For example, the analyzer 3 stores a deposited amount table indicating a relationship between a luminance value of a monitoring image (i.e., thermal image) and an amount of deposited combustion ash t in advance and evaluates the amount of deposited combustion ash t using the deposited amount table. The operation of the analyzer 3 will be described later in detail.

The monitoring panel 4 is provided in a monitoring room for monitoring the operation of the boiler. The monitoring panel 4 is provided for a monitoring operator who monitors the operation of the boiler, and displays various types of information indicating an operation state of the boiler (i.e., boiler operation information). The monitoring panel 4 outputs an alert for combustion ash on the basis of the result of evaluation from the analyzer 3 as one piece of boiler operation information. That is, the monitoring panel 4 is an alert device in this embodiment.

Figure 3:
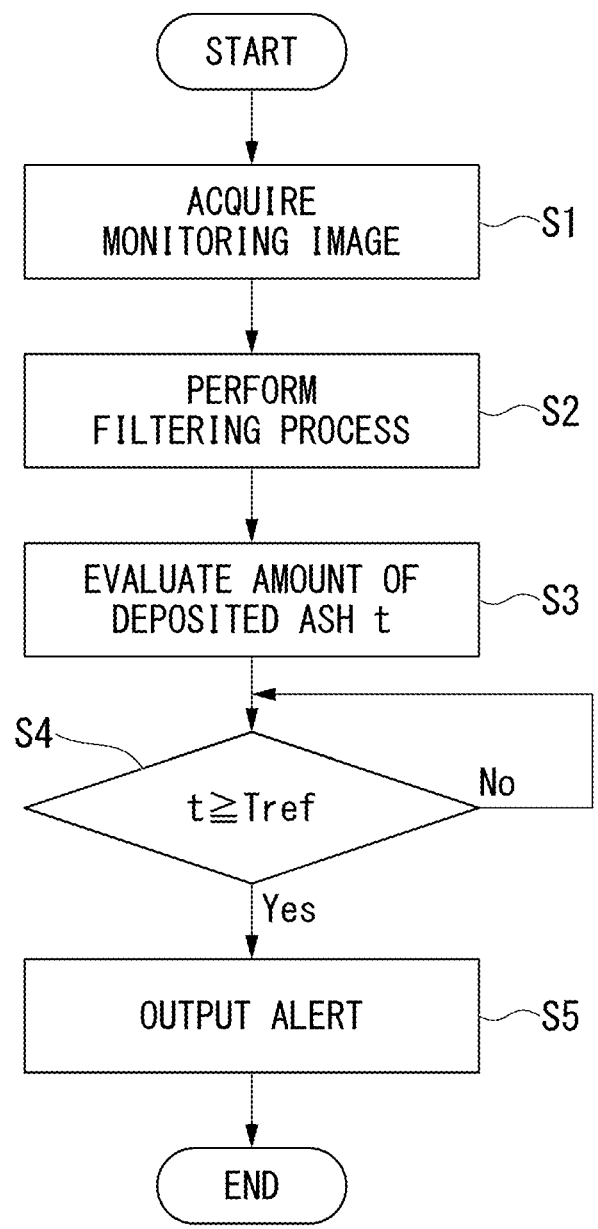
FIG. 3 is a flowchart showing operations of the furnace monitoring device according to the embodiment of the present disclosure.

The operation of the furnace monitoring device A according to this embodiment will be described below in detail with reference to FIG. 3.

In the furnace monitoring device A, the controller 2 instructs the infrared camera 1 to acquire a monitoring image (i.e., thermal image) on the basis of a preset time schedule. That is, at a timing set on the basis of the control program, the controller 2 outputs an acquisition instruction of a monitoring image (i.e., thermal image) to the infrared camera 1. Then, the infrared camera 1 sequentially acquires a monitoring image (i.e., thermal image) at the monitoring position on the basis of the acquisition instruction (Step S1).

Then, the monitoring image (i.e., thermal image) acquired by the infrared camera 1 in this way is input from the infrared camera 1 to the analyzer 3 via the controller 2. The analyzer 3 performs image processing, that is, a filtering process, on the monitoring image (i.e., thermal image) (Step S2). Noise included in the monitoring image (i.e., thermal image) is removed through the filtering process.

Then, the analyzer 3 acquires luminance values of the monitoring image (i.e., thermal image) and acquires an amount of deposited combustion ash t corresponding to the luminance value with reference to the deposited amount table stored in advance using the luminance value (Step S3). Then, the analyzer 3 determines whether the amount of deposited combustion ash t is greater a limit value by comparing the acquired amount of deposited combustion ash t with an evaluation threshold value Tref stored in advance (Step S4).

When the determination result of Step S4 is "YES," the analyzer 3 outputs an alert to the monitoring panel 4 (Step S5). This alert is for attracting a monitoring operator's attention to deposition of combustion ash and is voice output and/or output by an image. The monitoring operator can understand that the amount of deposited combustion ash is greater than the limit value through the alert.

According to this embodiment, since the amount of deposited combustion ash t is automatically evaluated on the basis of a monitoring image (i.e., thermal image) from the infrared camera 1, it is possible to provide evaluation of a deposition state of combustion ash more effectively than in the related art.

The present disclosure is not limited to the aforementioned embodiment and, for example, following modified examples can be conceived.

(1) In the aforementioned embodiment, the combustion furnace X of the boiler is used as a furnace to be monitored, but the present invention is not limited thereto. The present disclosure can be applied to various furnaces other than the combustion furnace X of the boiler.

(2) The infrared camera 1 that captures an image of combustion ash except for flames radiated from the burners x2 into the combustion furnace X may be used, but the present disclosure is not limited thereto. When the boiler wall x1 near the burners x2 is set as a monitoring position, an influence of flames needs to be removed, but since an influence of flames at other monitoring positions does not need to be considered, a general infrared camera may be used.

(3) In the aforementioned embodiment, the infrared camera 1 excluding flames from the burners x2 is used, but the present disclosure is not limited thereto. For example, by providing a function of excluding flames from the burners x2 in the analyzer 3, a general infrared camera may be used as the imaging unit.

(4) In the aforementioned embodiment, the controller 2 and the analyzer 3 are provided as independent devices, but the present disclosure is not limited thereto. That is, the function of the controller 2 and the function of the analyzer 3 may be integrally provided in a single unit.

INDUSTRIAL APPLICABILITY

According to the present disclosure, it is possible to provide a furnace monitoring device that can evaluate a deposition state of combustion ash more effectively than in the related art.

REFERENCE SIGNS LIST

X Combustion furnace (i.e., furnace)
x1 Boiler wall x2 Burner
x3 Superheater
x4 Reheater
x5 Coal economizer
x6 Bent portion
x7 Monitoring window
R Combustion room
E Exhaust port
1 Infrared camera (i.e., imaging unit)
2 Controller (i.e., evaluation unit)
3 Analyzer (i.e., evaluation unit)
4 Monitoring panel (i.e., alert unit)

The invention claimed is:

1. A furnace monitoring device comprising:
at least one memory storing instructions;
at least one processor configured to execute the instructions;
an imaging unit configured to capture an image of combustion ash adhering to a monitoring position in a furnace; and
a monitoring panel configured to output an alert for the combustion ash,
wherein the at least one processor is configured to:
store a deposited amount table indicating a relationship between a luminance value of a monitoring image and an amount of deposited combustion ash in advance,
acquire a luminance value of a monitoring image which is output from the imaging unit,
acquire an amount of deposited combustion ash corresponding to the luminance value acquired with reference to the deposited amount table using the luminance value required, and
make the monitoring panel output the alert on the basis of the amount of deposited combustion ash acquired.

2. The furnace monitoring device according to claim 1, wherein the furnace is a combustion furnace of a boiler.

3. The furnace monitoring device according to claim 2, wherein the monitoring position is a superheater.

4. The furnace monitoring device according to claim 1, wherein the monitoring position is a surrounding of a burner that is provided in the furnace.

5. The furnace monitoring device according to claim 1, wherein the imaging unit is an infrared camera that captures an image of the combustion ash except for flames.

* * * * *